United States Patent
Ikeda

(10) Patent No.: US 8,156,911 B2
(45) Date of Patent: Apr. 17, 2012

(54) COMPRESSION IGNITION INTERNAL COMBUSTION ENGINE, GLOW PLUG, AND INJECTOR

(75) Inventor: Yuji Ikeda, Kobe (JP)

(73) Assignee: Imagineering, Inc., Kobe-shi, Hyogo (JP)

( * ) Notice: Subject to any disclaimer, the term of this patent is extended or adjusted under 35 U.S.C. 154(b) by 191 days.

(21) Appl. No.: 12/668,854

(22) PCT Filed: Jul. 12, 2008

(86) PCT No.: PCT/JP2008/062639
§ 371 (c)(1),
(2), (4) Date: Jan. 12, 2010

(87) PCT Pub. No.: WO2009/008521
PCT Pub. Date: Jan. 15, 2009

(65) Prior Publication Data
US 2010/0192909 A1    Aug. 5, 2010

(30) Foreign Application Priority Data

Jul. 12, 2007 (JP) ................. 2007-183769
Apr. 30, 2008 (JP) ................. 2008-119411

(51) Int. Cl.
*F02P 23/04* (2006.01)
(52) U.S. Cl. ................. 123/143 B
(58) Field of Classification Search ........... 123/143 B
See application file for complete search history.

(56) References Cited

U.S. PATENT DOCUMENTS

| | | | |
|---|---|---|---|
| 3,934,566 A | 1/1976 | Ward | |
| 4,138,980 A | 2/1979 | Ward | |
| 4,774,914 A * | 10/1988 | Ward | 123/162 |
| 5,027,764 A * | 7/1991 | Reimann | 123/143 B |
| 5,845,480 A | 12/1998 | DeFreitas et al. | |
| 6,581,581 B1 * | 6/2003 | Bebich | 123/536 |
| 7,838,854 B2 * | 11/2010 | Algots et al. | 250/504 R |
| 2009/0266325 A1 * | 10/2009 | Kumar et al. | 123/143 B |
| 2011/0030660 A1 * | 2/2011 | Ikeda | 123/536 |
| 2011/0031886 A1 * | 2/2011 | Ikeda | 315/111.21 |

FOREIGN PATENT DOCUMENTS

JP    51-77719 AA    7/1976

(Continued)

OTHER PUBLICATIONS

International Search Report of PCT/JP2008/062639, mailing date of Oct. 14, 2008.

*Primary Examiner* — Erick Solis
(74) *Attorney, Agent, or Firm* — Westerman, Hattori, Daniels & Adrian, LLP

(57) ABSTRACT

The invention provides a practical diesel engine that uses plasma formed by microwave emissions. In a compression-ignition internal combustion engine, fuel is sprayed by an injector in the combustion chamber in which compressed oxidizing gas is present, and the fuel is compressed and ignited. The engine has one antenna or a plurality of antennas in the combustion chamber, and when the oxidizing gas or moisture and charged particles are present in the combustion chamber, an electromagnetic wave is emitted using the antenna in a space in which the oxidizing gas and the charged particles are present, and plasma is generated in the space by the energy fed to the charged particles.

9 Claims, 16 Drawing Sheets

FOREIGN PATENT DOCUMENTS

| | | |
|---|---|---|
| JP | 6-229334 A | 8/1994 |
| JP | 9-049485 A | 2/1997 |
| JP | 2000-274249 A | 10/2000 |
| JP | 2001-317360 A | 11/2001 |
| JP | 2005-233107 A | 9/2005 |
| JP | 2006-132518 A | 5/2006 |
| JP | 2007-113570 A | 5/2007 |
| WO | 2008/035448 A1 | 3/2008 |

\* cited by examiner

COMPRESSION IGNITION INTERNAL COMBUSTION ENGINE, GLOW PLUG, AND INJECTOR

TECHNICAL FIELD

The disclosure relates to a diesel engine or another compression-ignition internal combustion engine in which compression is improved using plasma, and to a glow plug and injector therefor.

BACKGROUND OF THE INVENTION

Compression-ignition internal combustion engines typified by diesel engines are internal combustion engines in which air or another gas to be reacted with fuel is highly compressed, fuel is introduced into the high-temperature, high-pressure atmosphere, the fuel is dispersed to form a so-called mixture, and the mixture is made to self-ignite. Since the compression-ignition internal combustion engine can, in theory, use various types of fuel, the value of such engines as low-pollution engines is being reassessed. However, there is a problem in a diesel engine in that substances that cause air pollution are generated in large quantities when combustion is not carried out in optimal conditions. For example, the combustion reaction is incomplete when a load is suddenly applied, and particulate matter (PM) is produced. On the other hand, the combustion temperature is increased and nitrogen oxides ($NO_X$) are produced when an attempt is made to achieve a complete combustion reaction. In a diesel engine, ignition is achieved by injecting fuel using an injector into high-temperature, high-pressure air, but in principle it is difficult to control the ignition delay time, the spread of the flame, the amount in which exhaust gas is generated, and the uniformity of the areas of higher temperatures.

Also, in a diesel engine, air must be compressed at a higher pressure than in a spark-ignition engine during the compression stroke because the thermal energy required to ignite the fuel is obtained by adiabatic compression of the air in the cylinder, and the energy required in the compression stroke is greater by a commensurate amount than spark ignition.

There are widely known techniques for solving such problems of a diesel engine, as well as various other problems related to combustion in a compression-ignition internal combustion engine, examples of which include forming members that enclose the combustion chamber in a shape that produces a squish flow, swirling, or tumbling in the working fluid in the combustion chamber to facilitate the formation of a mixture by using the squish flow, swirling, or tumbling.

For example, there is also a technique referred to as common rail. This is a scheme in which fuel is pressurized inside a pipe referred to as a rail, and fuel injection is carried out by opening an electric valve provided to the injector. Since the fuel spray function is separately provided from the pump, it is possible to achieve fuel pressurization having a high valve-opening pressure in excess of 180 MPa, and to achieve spraying or another type of high-level spray control over a plurality of cycles. It is also possible to reduce $NO_X$, PM, and the like by high-level spray control and by the effect of shortening the time for mixing the fuel and a combustion aid by high-speed fuel jet flow.

Combustion enhancement that uses plasma is also receiving attention as a technique for solving various problems related to combustion in a compression-ignition internal combustion engine.

A typical combustion enhancement technique that involves a method for using plasma is disclosed in Patent Document 1.

The diesel engine described in Patent Document 1 is provided with a discharge electrode in the combustion chamber. The discharge electrode forms plasma by corona discharge when combustion by self-ignition occurs. Combustion is enhanced in the diesel engine by electrifying and ionizing the fuel using plasma.

The present inventors developed a technique for enhancing combustion of a mixture in a self-ignition internal combustion engine by using microwave emissions as described in Patent Document 2. In this technique, microwaves are emitted in the combustion/reaction region, and large quantities of OH radicals and ozone ($O_3$) are generated from the moisture in the mixture in the combustion/reaction region. Means for inducing self-ignition causes the mixture to ignite, and combustion of the mixture in the combustion/reaction region is enhanced by large quantities of OH radicals and ozone.

[Patent Document 1] Japanese Laid-open Patent Application No. 2001-317360

[Patent Document 2] Japanese Laid-open Patent Application No. 2007-113570

SUMMARY OF THE INVENTION

In a common rail injection system (hereinafter referred to as "common rail system"), a robust, high-precision pressurizing mechanism and spray mechanism are required for spraying at a high valve-opening opening pressure as described above in order to obtain a flame expanding effect. For this reason, a common rail system as such is costly, which prevents its widespread use.

The following problems arise when plasma is generated by an electrode, in the same manner as in the diesel engine described in Patent Document 1. Specifically, the region in which plasma is formed is determined by the distance between the cathode and the anode. The distance between the cathode and the anode must be increased in order to increase the scale of the plasma. When the distance between the cathode and the anode is increased, a high voltage must be applied between the cathode and the anode. Specifically, input energy is increased. Plasma formed by such a large amount of energy itself becomes a high-temperature ignition source. Such an engine cannot be referred to as a compression-ignition internal combustion engine, and the original advantages of an internal combustion engine in which combustion reaction is initiated by self-ignition are compromised.

In contrast, the technique described in Patent Document 2 does not have the problems described above because plasma is formed by microwave emissions from an antenna. It is therefore desirable to implement a compression-ignition internal combustion engine that uses this scheme.

According to a first aspect, a compression-ignition internal combustion engine is provided wherein fuel is injected by an injector into a combustion chamber in which gas provided to a reaction with fuel is present in compressed form, and the fuel is compressed and ignited, the compression-ignition internal combustion engine comprising: one antenna or a plurality of antennas in the combustion chamber, and when charged particles and moisture or the gas provided to the reaction with fuel in the combustion chamber are present, an electromagnetic wave is emitted using the antenna in a space in which the charged particles and the gas provided to the reaction with the fuel are present, and plasma is generated in the space by feeding energy to the charged particles.

According to a second aspect, the compression-ignition internal combustion engine of the first aspect is preferably configured such that in accordance with the state of the fuel injected by the injector, a magnetic field having a spatial distribution that corresponds to the state at that time is formed using the antenna by emitting the electromagnetic wave.

According to a third aspect, the compression-ignition internal combustion engine of the second aspect is preferably configured to further comprise a preparing portion preparing charged particles in the combustion chamber, wherein mixture formation, ignition delay time, flame spread, amount of exhaust gas generation, or uniformity of areas of higher temperatures is controlled by generating plasma before the fuel is ignited and increasing the chemical activity or chemical reactivity of the gas provided to the reaction with the fuel.

According to a fourth aspect, the compression-ignition internal combustion engine of the third aspect is preferably configured such that the preparing portion preparing charged particles provides supplies particles using one generation method or a plurality of plasma generation methods selected from the group consisting of electric discharge, laser-induced breakdown, friction, collision, and chemical reaction.

According to a fifth aspect, the compression-ignition internal combustion engine of the third aspect is preferably configured such that the preparing portion preparing charged particles prepares thermions.

According to a sixth aspect, the compression-ignition internal combustion engine of the second through fifth aspects is preferably configured such that an electromagnetic wave is emitted using the antenna when fuel is injected by the injector, a strong electric field is formed in a space near the fuel jet flow, and energy is fed to charged particles in the space near the fuel jet flow, whereby plasma is generated in the space.

According to a seventh aspect, the compression-ignition internal combustion engine of the second through fifth aspects is preferably configured such that an electromagnetic wave is emitted using the antenna when fuel is injected by the injector, a strong electric field is formed in a space near the end point of the fuel jet flow, and energy is fed to charged particles in the space near the end point of the fuel jet flow, whereby plasma is generated in the space.

According to an eighth aspect, the compression-ignition internal combustion engine of the second through fifth aspects is preferably configured such that an electromagnetic wave is emitted using the antenna when fuel is injected by the injector, a strong electric field is formed in a space that includes at least a predetermined point on the flow line of the fuel jet flow, and energy is fed to the charged particles in the space, whereby plasma is generated in the space.

According to a ninth aspect, the compression-ignition internal combustion engine of the eighth aspect is preferably configured such that formation of the strong electric field by emission of an electromagnetic wave using the antenna is carried out in a space in which the fuel of the fuel jet flow passes in a flow that includes at least one form among a spray, liquid, droplet, colloid, particulate liquid, and particulate solid.

According to a tenth aspect, the compression-ignition internal combustion engine of the eighth aspect is preferably configured such that formation of the strong electric field by emission of an electromagnetic wave using the antenna is carried out when the fuel jet flow injected by the injector reaches a space near the wall surface of the combustion chamber or the inner surface of the piston chamber, and is carried out in a space near the wall surface of the combustion chamber or near the inner surface of the piston chamber.

According to an eleventh aspect, the compression-ignition internal combustion engine of the second through fifth aspects is preferably configured such that the injector has a plurality of nozzles, and the plasma is generated in a predetermined sequence in the fuel injected by each of the nozzles.

According to a twelfth aspect, the compression-ignition internal combustion engine of the eighth aspect is preferably configured such that a squish flow, swirling, or tumbling is generated in the combustion chamber; and formation of the strong electric field by emission of an electromagnetic wave using the antenna is carried out in a space in which a flow or disturbance is generated when the flow or disturbance is generated by a squish flow, swirling, or tumbling in the working fluid containing the fuel.

According to a thirteenth aspect, the compression-ignition internal combustion engine of the second through fifth aspects is preferably configured such that the injector pre-injects fuel at least one time from the time the intake stroke is ended to the time the fuel subjected to compression ignition is injected; and an electromagnetic wave is emitted using the antenna when fuel is pre-injected by the injector, a strong electric field is formed in a space near the fuel jet flow, and energy is fed to the charged particles in the space near the fuel jet flow, whereby plasma is generated in the space.

According to a fourteenth aspect, the compression-ignition internal combustion engine of the thirteenth aspect is preferably configured such that the pre-injected fuel is ignited by generation of the plasma.

According to a fifteenth aspect, the compression-ignition internal combustion engine of the sixth through fourteenth aspects is preferably configured such that the injector has a plurality of nozzles; and the electromagnetic wave is emitted toward spaces between the plurality of jet flows from the plurality of nozzles.

According to a sixteenth aspect, the compression-ignition internal combustion engine of the second through fifteenth aspects is preferably configured such that a strong electric field is formed near the boundary between the fuel jet flow and gas provided to the reaction with the fuel after the fuel has been ignited, and energy is fed to the charged particles generated by a charged-particle flame inside a flame produced near the boundary.

According to a seventeenth aspect, the compression-ignition internal combustion engine of the first through sixteenth aspects is preferably configured such that the electromagnetic waves are emitted intermittently.

According to an eighteenth aspect, the compression-ignition internal combustion engine of the seventeenth aspect is preferably configured such that the emission time of a single cycle of the intermittent electromagnetic wave emission is about 2.5 milliseconds or less.

According to a nineteenth aspect, the compression-ignition internal combustion engine of the eighteenth aspect is preferably configured such that the emission time of a single cycle of the intermittent electromagnetic wave emission is 1 microsecond or less.

According to a twentieth aspect, the compression-ignition internal combustion engine of the seventeenth aspect is preferably configured such that the plasma generated in the space by the emission of the electromagnetic wave is non-equilibrium plasma.

According to a twenty-first aspect, the compression-ignition internal combustion engine of the first through twentieth aspects is preferably configured such that the electromagnetic wave is emitted during cold start or during transient operation.

According to a twenty-second aspect, the compression-ignition internal combustion engine of the first through twenty-first aspects is preferably configured such that at least one parameter selected from among the strength, timing, number of cycles, duration, time fluctuation, and spatial distribution of the electromagnetic wave emission is determined based on information inputted to an ECU.

According to a twenty-third aspect, a glow plug used in the compression-ignition internal combustion engine according to any of aspects 1 through 22, comprises a heating element including a resistance wire and arranged facing the interior of a combustion chamber; an power feed wire connected to the resistance wire; an antenna for resonating an electromagnetic wave including a predetermined frequency, the antenna being joined to the heating element or the power feed wire via a dielectric; and an electromagnetic wave transmission channel for feeding power to the antenna, wherein the antenna emits an electromagnetic wave in the direction of an injector.

According to a twenty-fourth aspect, an injector used in the compression-ignition internal combustion engine according to any of aspects 1 through 22, comprises one nozzle or a plurality of nozzles provided to an injector main unit; and an antenna arranged on the outer surface of the injector main unit, wherein the antenna emits an electromagnetic wave toward the vicinity of a jet flow from the nozzles.

According to a twenty-fifth aspect, the compression-ignition internal combustion engine of the second aspect is preferably configured to further comprise: a preparing portion preparing charged particles in the combustion chamber, wherein the pressure distribution in the combustion chamber is controlled by generating plasma and increasing the chemical activity or the chemical reactivity of gas provided to the reaction with the fuel when knocking occurs.

According to a twenty-sixth aspect, the compression-ignition internal combustion engine of the first aspect is preferably configured such that the generation the plasma is controlled for each cycle or cylinder.

According to a twenty-seventh aspect, the compression-ignition internal combustion engine of the first aspect is preferably configured such that the generation of the plasma is controlled in accordance with the fuel type.

According to a twenty-eighth aspect, a compression-ignition internal combustion engine wherein fuel is injected by an injector into a combustion chamber in which gas provided to a reaction with fuel is present in compressed form, and the fuel is compressed and ignited, the compression-ignition internal combustion engine comprises a disposing portion disposing charged particles in a space in which fuel, moisture, or gas provided to the reaction with fuel introduced into the combustion chamber is present; and one antenna or a plurality of antennas for emitting an electromagnetic wave toward the space, wherein when charged particles and moisture or the gas provided to the reaction with fuel introduced into the combustion chamber are present, an electromagnetic wave is emitted using the antenna in a space in which the charged particles and the gas provided to the reaction with the fuel are present, and plasma is generated in the space by feeding energy to the charged particles.

In accordance with the first aspect, the chemical activity or chemical reactivity of gas provided to the reaction with fuel can be increased and combustion improved with the aid of plasma by generating the plasma through electromagnetic emissions using an antenna in a space containing charged particles and moisture or gas provided to the reaction with the fuel. The method for generating the plasma does not require high voltage or high power.

The mixing of fuel and gas provided to the reaction with fuel can be facilitated by increasing the temperature and pressure in the above-described space and peripheral areas. Plasma is generated, whereby a density difference, temperature difference, and/or pressure difference is produced between the plasma-generating region and the peripheral areas as well as other areas. The difference causes a change in the movement of the particles constituting the fuel jet flow. Accordingly, the speed or the direction of movement of the jet flow can be changed and fuel can be directed to a desired region by making use of this difference. Since a desired flow can be formed at the desired time in the combustion chamber, the flow of the working fluid in the combustion chamber can be adjusted in accordance with the constantly varying state of the combustion chamber. The required conditions for ignition are relaxed by such a chemical effect, a thermal effect, or both, of the plasma. The number of locations in which ignition is carried out can thereby be increased. The start of the catalytic reaction can furthermore be made to occur sooner due to the increase in temperature when a catalytic filter is disposed downstream from the combustion chamber in order to treat exhaust.

In accordance with the second aspect, an electric field having a desired spatial distribution can be formed at a desired time to make it possible to obtain appropriate chemical reactions, including performing plasma-based ignition and combustion in a compression-ignition internal combustion engine.

In accordance with the third aspect, mixture formation, ignition delay time, flame spreading, amount of generated exhaust gas, or the uniformity of the areas of higher temperatures can be controlled in a compression-ignition internal combustion engine.

In accordance with the fourth aspect, plasma generation can be initiated by an electric discharge, laser-induced breakdown, friction, collision, or chemical reaction.

In accordance with the fifth aspect, plasma generation can be initiated by thermions.

In accordance with the sixth aspect, plasma can be sustained in regions in which the flame has difficulty spreading near the fuel jet flow, and the spread of the flame can be facilitated and combustion improved. The spread of the flame can reduce combustion time, make the temperature increase uniform, and reduce the generation of nitrogen oxides due to heat. Plasma is generated, whereby a density difference, temperature difference, and/or pressure difference is produced between the plasma-generating region and the peripheral areas as well as other areas. The difference causes a change in the movement of the particles constituting the fuel jet flow. Accordingly, the speed and the direction of movement of the jet flow can be changed and fuel can be directed to a desired region by making use of this difference. Since a desired flow can be formed at the desired time in the combustion chamber, the flow of the working fluid in the combustion chamber can be adjusted in accordance with the constantly varying state of the combustion chamber.

In accordance with the seventh aspect, plasma can be sustained in regions in which the flame has difficulty spreading near the end point of the fuel jet flow, and the spread of the flame can be facilitated and combustion improved. The spread of the flame can reduce combustion time, make the temperature increase uniform, and reduce the generation of nitrogen oxides due to heat. Plasma is generated, whereby a density difference, temperature difference, and/or pressure difference is produced between the plasma-generating region and the peripheral areas as well as other areas. The difference causes a change in the movement of the particles constituting the fuel jet flow. Accordingly, the speed and the direction of movement of the jet flow can be changed and fuel can be directed to a desired region by making use of this difference. Since a desired flow can be formed at the desired time in the combustion chamber, the flow of the working fluid in the combustion chamber can be adjusted in accordance with the constantly varying state of the combustion chamber.

In accordance with the eighth aspect, plasma can be sustained in the space in which the fuel jet flow passes. A highly chemically active or reactive chemical species can thereby be generated from the gas provided to the reaction with the fuel present in the space through which fuel passes. Since the fuel passes through the space in which a highly chemically active or reactive chemical species is present, the fuel and the highly chemically active or reactive chemical species are mixed together. Ignition and combustion of the fuel can thereby be enhanced. Accordingly, it is possible to improve ignition and combustion without forcibly mixing fuel and air by using a high-speed spray. This contributes to improvement in the performance of a compression-ignition internal combustion engine and makes it possible to reduce the valve-opening pressure of the injector. This also contributes to simplification and lower cost of a compression-ignition internal combustion engine and the peripheral devices of the engine. When plasma is generated, a density difference, temperature difference, and/or pressure difference is produced between the plasma-generating region and the region in which the gas composition has changed due to the plasma, as well as the peripheral areas and other areas. The difference causes a change in the movement of the particles constituting the fuel jet flow. Since the speed and the direction of movement of the jet flow can be changed by making use of this difference, the angle of spread, the direction of advance, and the speed of the fuel can be adjusted in accordance with the constantly varying state of the combustion chamber.

In accordance with the ninth aspect, plasma is made to operate in the space in which the fuel of the fuel jet flow passes in a flow that includes at least one form among a spray, liquid, droplet, colloid, particulate liquid, and particulate solid. A highly chemically active or reactive chemical species can thereby be generated from the gas provided to the reaction with the fuel made present in advance in the space through which the fuel passes in a flow that includes at least one form among a spray, liquid, droplet, colloid, particulate liquid, and particulate solid. A highly chemically active or reactive chemical species can be mixed with liquid fuel because the fuel of the fuel jet flow passes in a flow that includes at least one form among a spray, liquid, droplet, colloid, particulate liquid, and particulate solid. The fuel attracts the chemical species that have high chemical activity or chemical reactivity. The fuel moves by its own kinetic energy and thereby transports the highly chemically active or reactive chemical species in the direction of movement of the fuel. As a result, the extent to which combustion is enhanced and other effects are achieved is expanded by the highly chemically active or reactive chemical species. Since the vaporization and dispersion of the fuel are facilitated, it is also possible to reduce unvaporized fuel from being deposited on the wall surfaces of the combustion chamber, the auxiliary chamber, or in other locations.

In accordance with the tenth aspect, plasma can be sustained in the region in which disturbance is produced when the fuel jet flow collides with the wall surface of the cylinder or the inner surface of the piston chamber, and the fuel and air are vigorously mixed together. Plasma is sustained in such a region to thereby facilitate the mixing of three components, i.e., the fuel, the gas provided to the reaction with fuel, and the highly chemically active or reactive chemical species generated in accompaniment with the plasma. As a result, the spread of the flame and the progress of the combustion reaction are facilitated, and combustion is improved.

In accordance with the eleventh aspect, plasma can be generated in a predetermined sequence in the fuel injected by each of a plurality of nozzles of the injector.

In accordance with the twelfth aspect, plasma can be sustained in a region in which a flow or disturbance is generated in the working fluid using a squish flow, swirling, or tumbling, and the air and fuel are vigorously mixed. Plasma is sustained in such a region to thereby facilitate the mixing of three components, i.e., the fuel, the gas provided to the reaction with fuel, and the highly chemically active or reactive chemical species generated in accompaniment with plasma. As a result, the spread of the flame and the progress of the combustion reaction are facilitated, and combustion is improved. Additionally, the shape of members that form the combustion chamber can be simplified because a combustion-improving effect is obtained even when a squish flow, swirling, or tumbling is generated only moderately.

In accordance with the thirteenth aspect, the injection of fuel by the injector occurs before the injection of fuel for compression ignition. Plasma is sustained in the space near the fuel jet flow produced by the injection, and the chemical activity or chemical reactivity of the gas provided to the reaction with fuel is increased by the plasma. The fuel jet flow and the gas provided to the reaction with fuel having higher chemical activity or chemical reactivity are mixed together, and a working fluid having high ignitability is formed. A working fluid with high ignitability thereafter facilitates compression ignition when the fuel provided to compression ignition is injected. This shortens ignition delay time, facilitates flame spreading, and contributes to a more uniform temperature increase and mixing of the working fluid.

In accordance with the fourteenth aspect, plasma generation during pre-injection makes it possible to form and ignite a working fluid having high ignitability during pre-injection. In an ordinary compression step, ignition is not achieved because the working fluid formed at this time does not reach the ignition point temperature, even when fuel is injected by pre-injection, but it is possible to ignite the pre-injected fuel at a desired timing when plasma is sustained. Heat is produced by igniting the pre-injected fuel when the working fluid is directly ignited by generating plasma. The molecular weight of the fuel is reduced by the ignition, and the number of molecules in the working fluid in the combustion chamber is increased. The temperature and pressure in the combustion chamber are increased accordingly. In other words, it is possible to supplement a portion of the energy required in the adiabatic compression for compressing and igniting the working fluid in the combustion chamber by igniting the pre-injected fuel.

In accordance with the fifteenth aspect, plasma can be sustained in the direction toward the space between the plurality of jet flows in which the flame has difficulty spreading, and the spread of the flame can be facilitated and combustion improved.

In accordance with the sixteenth aspect, a strong electric field is formed near the boundary between the fuel jet flow and the gas provided to the reaction with fuel after ignition, whereby the chemical activity or chemical reactivity of the gas provided to the reaction with fuel can be increased in this region, and the spread of the flame can be facilitated.

In accordance with the seventeenth and eighteenth aspects, plasma can be generated with high-energy efficiency by intermittently emitting an electromagnetic wave, and can be sustained in the gas provided to the reaction with fuel. This contributes to energy savings and higher efficiency.

In accordance with the eighteenth aspect, plasma can be prevented from overheating by setting the emission time to about 2.5 milliseconds or less. This contributes to a reduction in the generation of heat-induced nitrogen oxides.

In accordance with the twentieth aspect, the efficiency of generating unstable molecules and radicals with high chemical activity or chemical reactivity is high, and the heat-induced deactivation of such molecules and radicals can be reduced. It is possible to dramatically and efficiently improve the chemical activity or chemical reactivity of the gas provided to the reaction with fuel by using non-equilibrium plasma.

In accordance with the twenty-first aspect, the chemical activity or chemical reactivity of the gas provided to the reaction with fuel is enhanced and combustion is improved using plasma during cold start or during transient operation, in which the generation of soot or the like is particularly high. This particularly contributes to a reduction in the generation of PM. The amount of formaldehyde generated in large quantities during a cold start in particular can be reduced. The temperature and reactivity of the working fluid is increased, and the startup of the catalytic filter disposed downstream of the combustion chamber can be made to occur sooner. Also, a clogged diesel particulate filter (DPF) is more readily regenerated. It is also possible to regenerate the DPF by forming exhaust that has a higher temperature or higher reactivity.

In accordance with the twenty-second aspect, the strength, timing, number of cycles, duration, time fluctuation, spatial distribution, and other parameters of the electromagnetic wave emission can be suitably determined based on information inputted to an ECU. Suitable improvement in combustion that uses plasma can therefore be anticipated.

In accordance with the twenty-third aspect, it is possible to readily achieve the effects of the first to twenty-second aspects at low cost in a conventional compression-ignition internal combustion engine by integrating an antenna and a readily detachable glow plug in the combustion chamber.

In accordance with the twenty-fourth aspect, it is possible to readily arrange an antenna at low cast in a suitable position, and to achieve the effects of the first to twenty-second aspects in a conventional compression-ignition internal combustion engine by integrating an antenna and a readily detachable injector in the combustion chamber.

As described above, in accordance with the present invention, electromagnetic wave emission and the formation of plasma in conjunction with the electromagnetic wave emission make it possible to obtain the same effects as the effect of improved mixing brought about by faster fuel injection, the effect of reduced ignition delay time, and the effect of reduced combustion time. In other words, the present invention can yield the same operation and effect as the common rail system while reducing the valve-opening pressure in a fuel injection mechanism. This contributes to a simplification of the structure of the fuel injection mechanism.

In accordance with the present invention, electromagnetic wave emission and the formation of plasma in conjunction with the electromagnetic wave emission make it possible to obtain the same effects as the effect of improved mixing brought about by numerous fuel injections, the effect of improving ignition-timing control, and the exhaust cleaning effect. In other words, the present invention can yield the same operation and effect as the common rail system while reducing the number of fuel injections in a compression-ignition internal combustion engine. This contributes to simplifying the control of the fuel injection mechanism. Additionally, the present invention makes it possible to achieve, without fuel injection, the same effects as the effect of improved mixing brought about by multiple fuel injections, the effect of improving ignition-timing control, and the exhaust cleaning effect. This contributes to a reduction in fuel consumption.

In accordance with the present invention, it is possible to maintain plasma so as to reduce ignition and combustion time when fuel is pre-injected, and to reduce incomplete combustion. These advantages make it possible to reduce energy loss in the thermal cycle of a compression-ignition internal combustion engine and to bring the thermal cycle closer to an ideal thermal cycle. This contributes to improving the energy efficiency in a compression-ignition internal combustion engine.

In other words, the present invention provides a practical compression-ignition internal combustion engine that uses plasma formed by microwave emission.

DETAILED DESCRIPTION OF THE INVENTION (First Embodiment)

In the present embodiment, the fuel contains a hydrocarbon compound, and the gas provided to the reaction with fuel is air. The gas reacts with fuel as an oxidizing gas or combustion-supporting gas, and combustion is achieved as a result.

Figure 1:
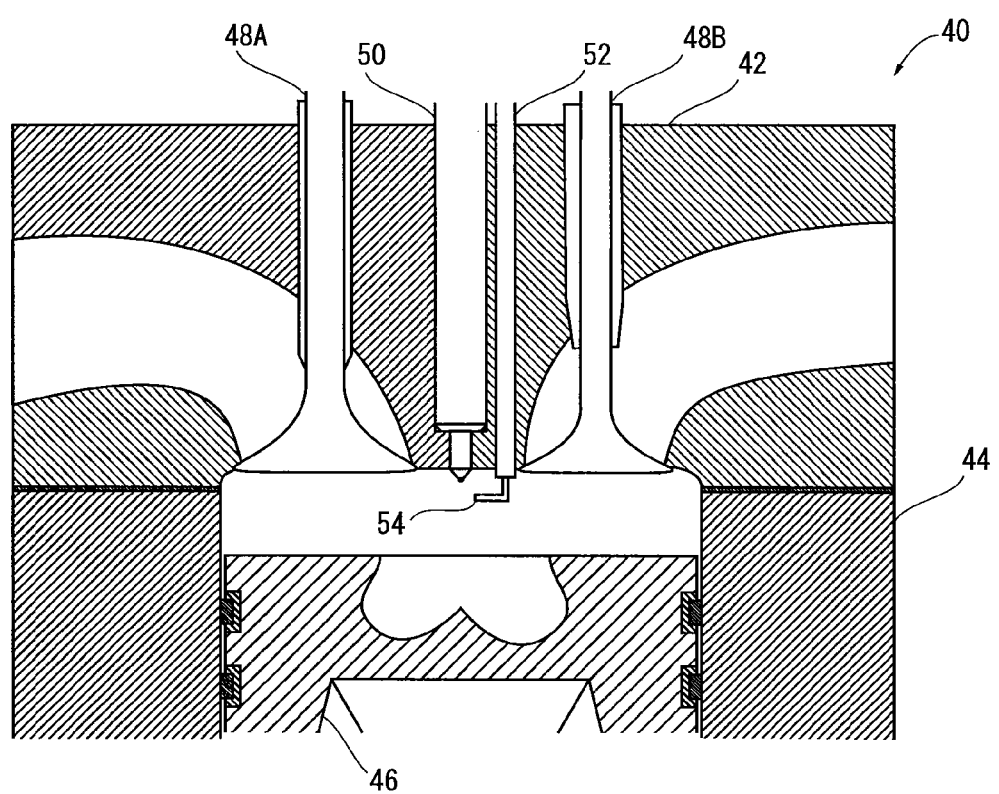
FIG. 1 is a view showing the internal composition of a diesel engine (direct injection-type) according to the first embodiment.

FIG. 1 shows the internal composition of a diesel engine 40 as an example of a compression-ignition internal combustion engine in which the method form improving combustion according to the present embodiment is implemented.

The diesel engine 40 has a cylinder head 42, a tubular cylinder liner 44 joined to the cylinder head 42, and a piston 46 that makes sliding contact with the cylinder liner 44, as shown in FIG. 1. The space enclosed by these members is a combustion chamber.

An intake port and an exhaust port are provided to the cylinder head 42, and valves 48A, 48B that can be opened and closed are arranged facing the combustion chamber in the boundary area between the combustion chamber and the intake and exhaust ports. An injector 50 for injecting fuel is mounted on the cylinder head 42.

A through-hole is provided in the cylinder head 42, the hole extends from the surface (hereinafter referred to as first surface) in contact with the combustion chamber to the surface (hereinafter referred to as second surface) in contact with space outside the combustion chamber, and a microwave transmission channel 52 is inserted so as to fill the through-hole. An antenna 54 for resonating microwaves having a predetermined frequency is connected to the combustion chamber-side of the microwave transmission channel 52.

Specifically, the microwave transmission channel 52 is a coaxial cable. The antenna specifically resonates with microwaves in the 2.45 GHz band.

In the diesel engine 40, the gas provided to the reaction with fuel is air that contains moisture and is introduced into the combustion chamber via an intake port. The air thus introduced is compressed by the piston 46 to a high pressure and high temperature inside the combustion chamber. In this state, the injector 50 sprays fuel.

Figure 2:
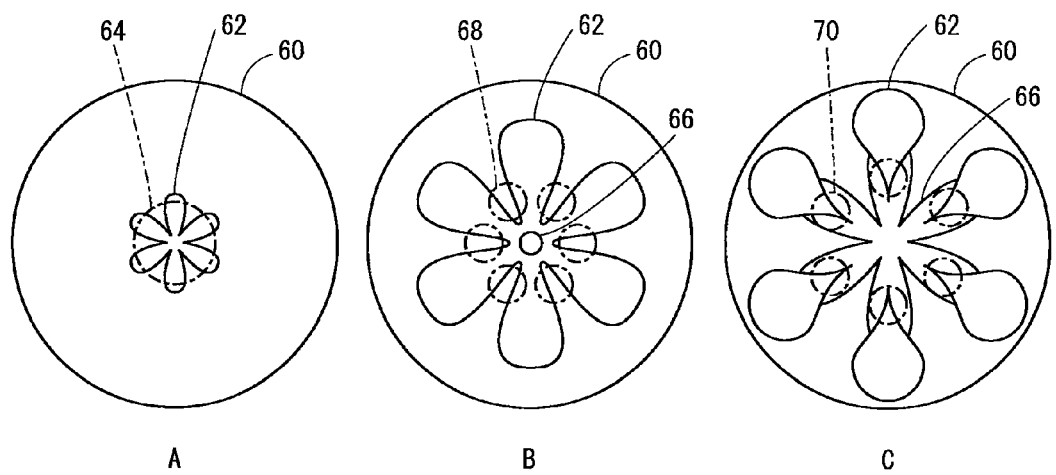
FIG. 2 is a schematic view showing changes in the spatial distribution of the air, fuel, and flame in the combustion chamber.

FIG. 2 shows a schematic view of changes in the spatial distribution of the air, fuel, and flame in the combustion chamber.

When the injector 50 sprays fuel when the piston near top dead center, the sprayed fuel is ignited, as shown in FIG. 2, and a flame 62 is formed in a radiating shape about the center of the injector 50, as indicated by A in FIG. 2. Vaporized uncombusted fuel and a liquid or mist fuel are present inside the flame 62. Since the flame 62 is weakly ionized plasma, large quantities of electrons and ions are present in the flame. When a microwave pulse is fed with such timing by the antenna 54 in the region 64 near the flame 62 via the microwave transmission channel 52, the electrons in the flame 62 are energized, and made to accelerate and collide with air molecules present in the region 60 on the periphery of the flame. The molecules become ionized by the collision and form plasma. The electrons in the plasma are further energized by the microwave pulse and are accelerated. Plasma is formed by this avalanching chain reaction, and plasma expands in this manner.

The expansion speed of the plasma is greater than the spread of the injection flame, and instantaneously reaches 100 meters per second or more. In other words, a plasma region is formed before the spread of the flame. The plasma is sustained in the following manner, for example, in the gas in the combustion chamber.

Fuel ionizes to form ions, resulting in enhanced chemical activity or chemical reactivity. A reaction is produced between ions in the plasma that originate from the fuel, and a highly oxidative active chemical species (e.g., ozone, OH radicals, and other activate oxygen) produced as a result of a higher chemical activity or chemical reactivity due to oxygen or moisture in the air. In other words, so-called non-equilibrium plasma is generated in the first stage of plasma generation. A highly oxidative active chemical species such as ozone, OH radicals, or other active oxygen is generated from the air. The fuel oxidation reaction and combustion are thereby enhanced. The first stage of the combustion reaction stroke is essentially carried out by dissociating fuel and air. Since this happens at high speed, combustion is rapidly carried out at the boundary between the fuel and air. Combustion is enhanced because ions are heated in the formation of plasma.

Highly chemically active or reactive chemical species such as OH radicals and other radicals, ozone and other unstable molecules, or the like are present in the region treated with plasma. Self-ignition readily occurs in such a space. It is possible to improve ignition delay and to control the formation of a mixture, the ignition delay time, the spread of the flame, and the amount of generated exhaust gas, or the uniformity of the areas of higher temperatures. It is possible to reduce or avoid knocking with improved ignition delay. The amount of formaldehyde generated during cold start, for example, can be reduced in relation to the amount of generated exhaust gas.

FIG. 2B schematically shows the spatial distribution of the flame 62 at the time when fuel injection by the injector 50 has ended. A star-shaped combustion region having a plurality of branches is formed along the fuel jet flow when combustion by injection and flame progresses. A region (combusted region) 66 in which the combustion reaction has ended begins to form near the injector.

In this state, uncombusted regions are formed in the regions 68 between branches. Plasma is sustained in the branch portions when a microwave pulse is emitted toward these regions 68, and a highly oxidative active chemical species is generated in the regions 68 due to the plasma. The injected fuel is more likely to make contact with the highly oxidative active chemical species in the gas provided to the reaction with fuel. Therefore, fuel is more likely to undergo an oxidation reaction, resulting in a readily ignitable and combustible state, which is a state in which the fuel and gas provided to the reaction with fuel are adequately mixed. The plasma imparts heat energy to the fuel, the fuel is vaporized and diffused, and the formation of a mixture is facilitated. As a result, combustion is enhanced.

These factors considerably narrow the distance between branches and make combustion more uniform. A state of combustion that resembles volumetric ignition is thereby formed between the branches.

FIG. 2C schematically shows the spatial distribution of the flame 62 in a state in which combustion has progressed even further. When combustion progresses to this state, the combusted region expands further. The combusted region contains carbon dioxide with low chemical activity or chemical reactivity, in addition to large quantities of soot, moisture produced in combustion, and reducing gases that are generated by reducing chemical species, i.e., uncombusted fuel and incompletely combusted fuel. Plasma spreads from the flame when microwaves are emitted in the boundary vicinity 70 between the flame and the combusted region, and plasma is sustained in the combusted region.

The chemical activity or chemical reactivity of the chemical species in the combusted region in thereby increased. Specifically, OH radicals are generated from the moisture. When the OH radicals spread out, an oxidizing reaction is facilitated in the uncombusted and combusted regions. The reducing chemical species are also ionized. Furthermore, the heat of the plasma contributes to facilitating the reaction, and complete combustion is thereby more readily achieved in the combusted regions.

As described above, the microwave transmission channel 52 and the antenna 54 for introducing microwaves into the combustion chamber are integrally formed in the diesel engine 40 of the present embodiment. Accordingly, combustion in a compression-ignition internal combustion engine, which is a self-ignition combustion engine, can be assisted by microwaves without replacing the cylinder block main unit and without making considerable modifications. More specifically, combustion can be improved by highly chemically active or reactive chemical species produced as a result of microwave-induced expansion of plasma.

Such an effect can be adequately obtained by microwave emission within about 1 millisecond. In view of the time delay required for plasma formation and the combustion-improving effect obtained by heating with plasma, the microwave emission may last for about 2.5 milliseconds. The microwave emission time may be further reduced to 1 μs or less, whereby the time for heating the plasma and the gas in the vicinity of the plasma can be reduced by a commensurate amount. As a result, plasma having a temperature of about 1500 degrees or less can be formed. In this manner, so-called thermal $NO_X$, i.e., nitrogen oxides normally produced by the thermal reaction, are not generated. As a result, an ideal combustion state can be obtained without increasing the nitrogen oxide concentration. When the microwave emission time is further reduced, it is possible to generate and use only non-equilibrium plasma. The non-equilibrium plasma has a better generation ratio of OH radicals or the like than plasma in a state of thermal equilibrium. Accordingly, combustion can be improved by using high-efficiency plasma. OH radicals and the like are furthermore generated each time plasma is generated when such microwave emission is repeated in an intermittent fashion. For this reason, the overall amount of highly oxidative active chemical species can be increased. The amount of power required for emitting microwaves can be reduced by emitting microwaves in an intermittent fashion.

An ECU may be used for controlling such microwave emissions. Combustion can be improved more efficiently using plasma when microwave emissions are controlled based on fuel composition, injection amount, injection timing, air temperature, pressure, humidity, exhaust gas recirculation (EGR) state, throttle position, and various other types of information. For example, when microwaves are emitted during cold start or during transient operation, it is possible to reduce the generation of soot, which is high at such times. Parameters of the electromagnetic wave emission, including strength, timing, number of cycles, duration, time fluctuation, and/or spatial distribution, can be suitably determined by an ECU, thereby making it possible to achieve a suitably improved combustion that corresponds to the operating state.

(Modification of the First Embodiment)

Described in the embodiment above is a case of generating plasma in the vicinity of the fuel jet flow. However, the present invention is not limited to such an embodiment. Plasma may be generated along the fuel jet flow.

Figure 3:
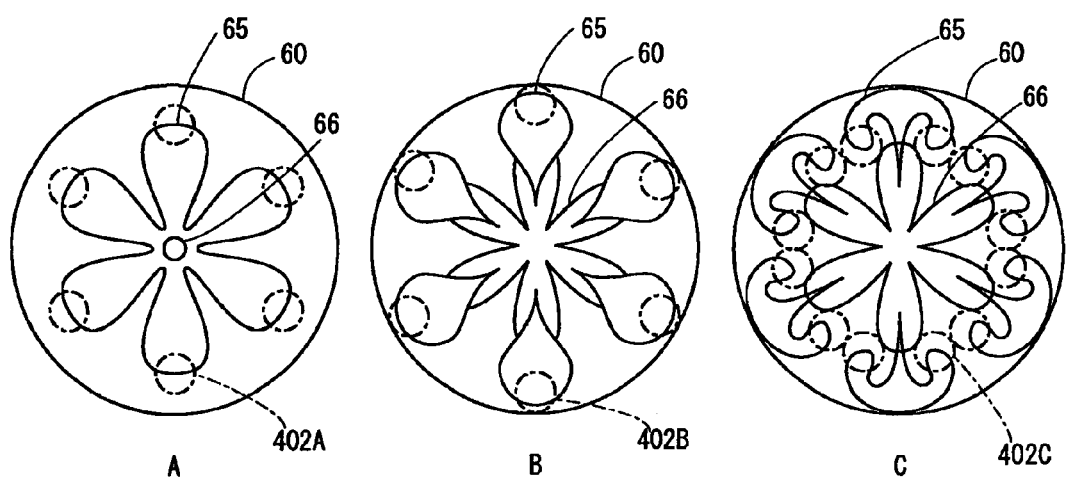
FIG. 3 is a schematic view showing the relationship between the spatial distribution of the air and fuel and the locations where plasma is generated in the combustion chamber in the first embodiment (modified example)

FIG. 3 shows the relationship between the spatial distribution of air and fuel and the positions where plasma is generated in the combustion chamber in such a modified example. FIG. 3A shows the spatial distribution of the fuel immediately after the fuel has been injected by the injector 50. The fuel is present in fuel jet flow 65 portion immediately after the start of injection from the injector 50, and present in the periphery of the fuel jet flow is air or the exhaust gas that is introduced by EGR, or left behind in the combustion chamber, or caused to flow back into the combustion chamber. The area of the fuel jet flow 65 contains a large amount of fuel in a liquid state or a mist state. The area of the fuel jet flow 65 also contains solid particles and fuel in a colloidal state. In other words, the fuel jet flow 65 may contain liquid or solid substances. At this point, the fuel that contains liquid or solid substances passes through a region 402A when plasma is formed in the region 402A near the distal end of the fuel jet flow.

Plasma feeds thermal energy to the fuel that contains liquid or solid substances, and the vaporization and diffusion of fuel and the formation of a mixture is facilitated. This contributes to a reduction in unvaporized fuel deposits on the surface of the combustion chamber wall. The plasma generates a highly oxidative active chemical species. The injected fuel is more likely to make contact with the highly oxidative active chemical species in the gas provided to the reaction with fuel. Therefore, fuel is more likely to undergo an oxidation reaction, resulting in a readily ignitable and combustible state, which is a state in which the fuel and gas provided to the reaction with fuel are adequately mixed.

The liquid or solid substances that pass through the region in which these highly oxidative active chemical species are generated have greater mass and kinetic energy than vaporized fuel molecules. Accordingly, the highly oxidative active chemical species adhere to or collide with these liquid or solid substances, receive kinetic energy from the substances, and are transported in a fuel-diffusing direction. In other words, the range of the spatial effects of the highly oxidative active chemical species is expanded.

FIG. 3B schematically shows the spatial distribution of fuel at the time when fuel injection by the injector 50 has ended. A fuel injection region having a plurality of branches is formed along the fuel jet flow 65 when fuel injection progresses. A region in which a mixture of gaseous fuel and air or another gas provided to the reaction with fuel is present is formed when the fuel vaporizes at the distal end of each branch. In this state, when a microwave pulse is emitted toward the distal end portion 402B of the branches, plasma is sustained in the branch portion, and the plasma generates a highly oxidative active chemical species. The likelihood of contact between the fuel injected into the mixture and the highly oxidative active chemical species is increased. Accordingly, the fuel will more likely undergo an oxidation reaction, resulting in a readily ignitable and combustible state, which is a state in which the fuel and gas provided to the reaction with fuel are adequately mixed. As a result, the time required for the start and end of combustion is reduced. In other words, the ignition delay time and the combustion time are reduced, and, more specifically, combustion is enhanced. Reduced combustion time contributes to an improvement in the efficiency of converting chemical potential energy to kinetic energy. Excessive temperature increase from combustion can be avoided because the combustion time is reduced. Also, the areas of higher temperatures are made more uniform. This contributes to a reduction in the generated amount of $NO_X$. Additionally, the generation of polycyclic aromatic hydrocarbons can be reduced. This contributes to a reduction in the amount of soot that is generated. It is furthermore possible to reduce the formation of regions in which the concentration of fuel is excessively high due to the mixing facilitating effect. Since ignition is improved, cold starting is also facilitated.

FIG. 3C shows the fuel distribution at the time when the fuel jet flow has reached the peripheral wall surface of the combustion chamber. At this point, the fuel jet flow 65 that has arrived at the wall surface spreads in the peripheral direction along the wall surface or the inner surface of the piston chamber. Accordingly, a disturbance field is formed between branches in the vicinity of the wall surface or the inner surface of the piston chamber. When the antenna emits an electromagnetic wave in the portion 402C in which the disturbance field is formed, plasma is generated in this portion. In addition to mixture formation due to the disturbance, effective mixture formation is facilitated because the fuel, the gas provided to the reaction with fuel, and the highly oxidative active chemical species formed in accompaniment with plasma are more readily mixed together by plasma in the same manner as described above. Also, ignition delay time and combustion time are reduced. The generation of UHC, PM, tar, and the like remaining after combustion is furthermore reduced because fuel oxidation as such is facilitated by highly oxidative active chemical species brought about by plasma. The spread of the flame, the amount of generated exhaust gas, or the uniformity of the areas of higher temperatures can also be improved.

Electromagnetic wave emission may be carried out near the trailing edge of the fuel jet flow to generate plasma in the area after fuel injection has ended. When electromagnetic waves are emitted near the trailing edge of the jet flow to generate plasma in the area, the area near the trailing edge of the jet flow is more readily ignited. Considerable energy can be obtained with the same amount of fuel in accordance with the increased likelihood that combustion will be carried out in areas where fuel conventionally remains uncombusted.

When ignition occurs and combustion is carried out near the trailing edge of the jet flow, the temperature in this area increases. The pressure in the region increases in accompaniment with the increased temperature. This exerts a force on the working fluid at the distal end of the spray in the direction away from the injector. The fuel at the distal end accelerates away from the injector. As a result, the time of arrival of the fuel at the wall surface of the piston chamber, the combustion chamber, or the subsidiary combustion chamber is reduced. Therefore, it is possible to obtain the same effect as increasing the fuel injection pressure of the injector.

Plasma may also be induced as required in the fuel itself, which is injected by the injector. Forced ignition may be performed by inducing the plasma, or a reaction sufficient to improve combustion without ignition may be carried out.

(Use of Squish Flow, Swirling, and Tumbling)

Figure 4:
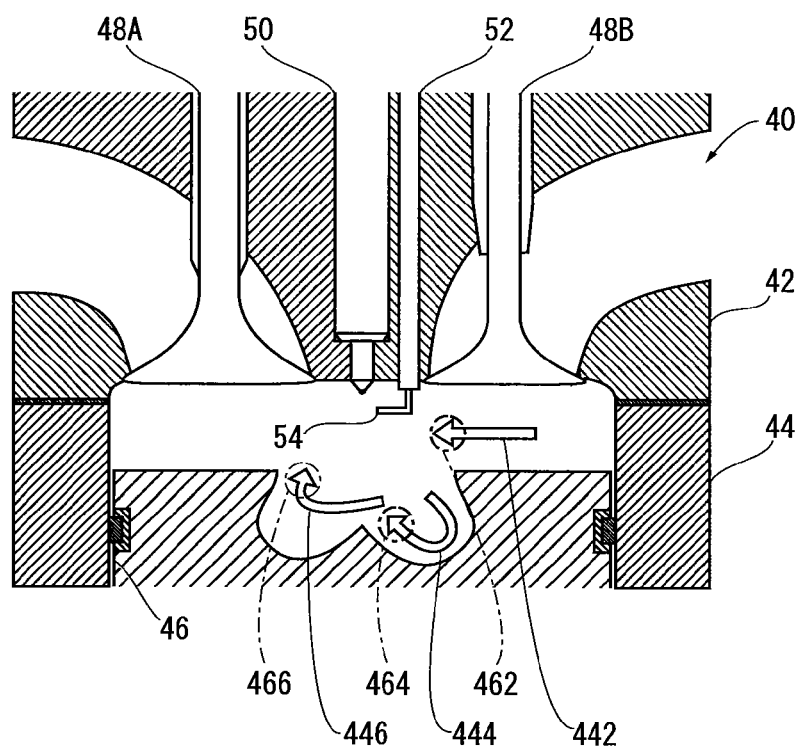
FIG. 4 is a schematic view showing the state in which a flow such as a squish flow, swirling, or tumbling is generated in the combustion chamber.

In the embodiment described above, electromagnetic waves were emitted in a region in the vicinity of or along the fuel jet flow directly formed by the fuel injection of the injector, but the present invention in not limited to such an embodiment. A flow such as a squish flow, swirling, or tumbling may be generated in the combustion chamber in addition to the fuel jet flow from the injector, as shown in FIG. 4. An electromagnetic wave may be emitted in a region in the vicinity of or along the squish flow, swirling, or tumbling to make use of plasma. The mixture formation effect is further facilitated by a squish flow, swirling, and tumbling to enhance combustion.

(Second Embodiment)

Figure 5:
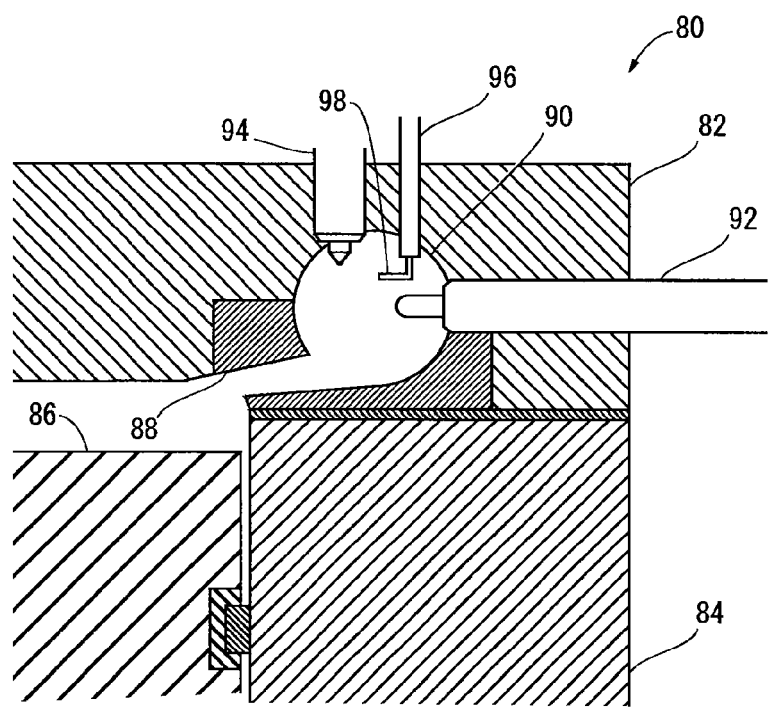
FIG. 5 is a view showing the internal composition of a diesel engine in accordance with the second embodiment.

The diesel engine 80 shown in FIG. 5 is a so-called subsidiary combustion chamber engine. The diesel engine 80 has a cylinder head 82, a cylinder liner 84, and a piston 86 that makes sliding contact with the cylinder liner 84, as shown in FIG. 5. A recess is provided in the cylinder head 82 in a position facing the piston.

The diesel engine 80 furthermore has a chamber collar 88 fitted onto the piston-side portion of the recess. A through-hole that passes from the remaining portion of the recess of the cylinder head 82 to the space facing the piston (i.e., the combustion chamber) is provided to the chamber collar 88. A swirl chamber 90 is formed by the portion on which the chamber collar 88 is not fitted around the recess of the cylinder head and by a portion of the through-hole in the chamber collar.

Three through-holes that pass from the swirl chamber 90 to a space outside the combustion chamber are formed in the cylinder head 82, and a glow plug 92, an injector 94, and a microwave transmission channel 96 are inserted as far as the swirl chamber 90 in the through-holes, respectively. An antenna 98 is connected to the end portion of the microwave transmission channel 96 on the side facing the swirl chamber. The antenna 98 is arranged so that the emitting end is near the surface of the glow plug 92, and the distal end of the injector 94 is disposed in the direction in which microwaves are emitted.

In the diesel engine 80, the portion of the glow plug 92 that protrudes into the swirl chamber 90 is red hot. The glow plug 92 imparts thermal energy to the mixture in the swirl chamber to thereby facilitate ignition.

The antenna 98 emits microwaves when a microwave pulse is fed to the antenna 98 via the microwave transmission channel 96. This composition causes plasma to expand in the same process as in the first embodiment, and combustion is enhanced.

The antenna 98 may be arranged facing a position reachable by the electrons emitted from the surface of the red-hot glow plug 92. This arrangement can also facilitate self-ignition in addition to facilitating combustion by microwave emission.

In other words, the glow plug 92 is already red hot at a stage prior to self-ignition, and thermions are emitted from the surface of the glow plug. When microwaves are emitted in the region in which thermions are present, the thermions are accelerated by energy imparted by the microwaves. The accelerated thermions trigger the generation and expansion of plasma in a chain reaction to generate plasma in the swirl chamber. The plasma increases the chemical activity or chemical reactivity of the mixture. Plasma is generated by not only electrons in the flame, but also by the thermions emitted from the surface of the glow plug 92. Therefore, plasma can be sustained in the mixture prior to ignition or at a time in which combustion progresses but has not yet formed a flame in the region in which the microwaves are emitted. Plasma is sustained in the mixture or air prior to ignition, whereby the activity of the mixture or the air is increased, and ignition can be facilitated as a result. Also, the plasma is sustained in a gas for which combustion has already ended in the combustion chamber, whereby the chemical activity or chemical reactivity of the atmosphere in the swirl chamber can be increased and combustion in the main combustion chamber can be enhanced.

(Modification of the Second Embodiment)

In the diesel engine 80, a microwave transmission channel and an antenna may be furthermore provided so as to emit microwaves in the main combustion chamber.

(Third Embodiment)

In the second embodiment and the modification of the second embodiment, the composition had a microwave transmission channel and an antenna disposed in the cylinder head, but the present invention is not limited to such a composition. An embodiment of a glow plug provided with a microwave transmission channel and an antenna is described hereinbelow.

Figure 6:
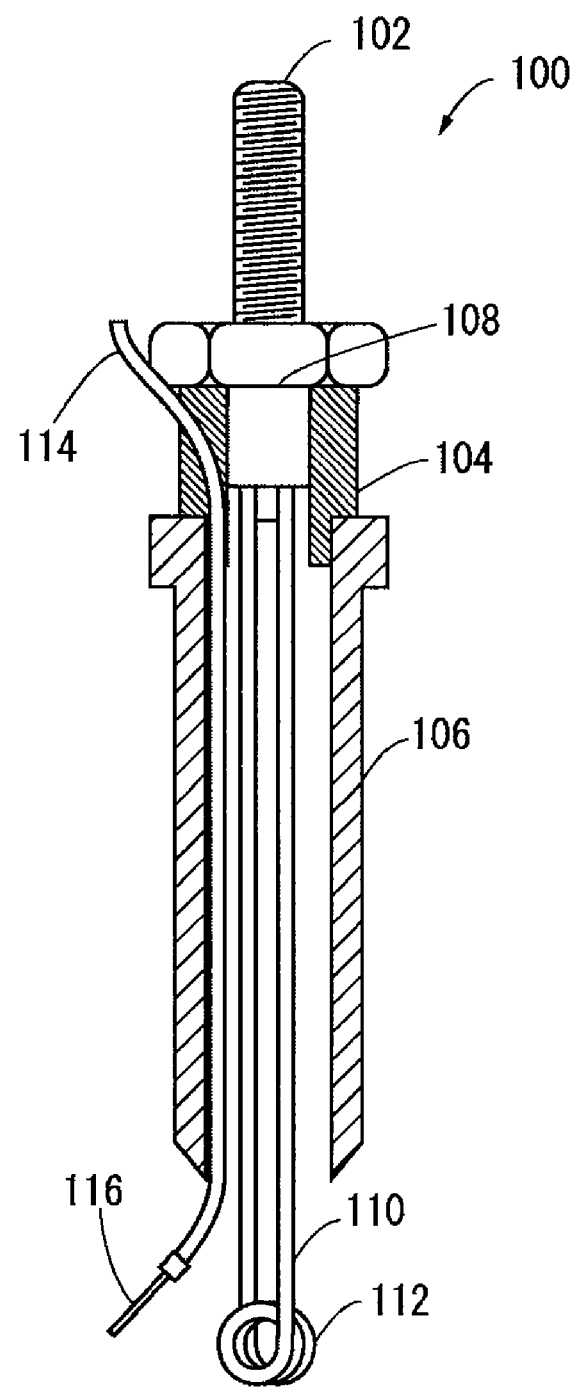
FIG. 6 is a schematic structural view of the glow plug according to the third embodiment.

FIG. 6 shows the composition of the glow plug 100 of the present embodiment. The glow plug 100 is a so-called red-hot coil-type glow plug, as shown in FIG. 6. The glow plug 100 has a terminal 102 to which power is fed for heating, a cap 104 joined to the terminal 102, a cylindrical case 106 joined to the cap 104, a connector 108 for accommodating a conductor (not shown) connected to the terminal 102 through the cap 104, a conductor power feed wire 110 connected to the connector 108, and a resistance wire 112 provided to the side opposite from the connector 108 of the power feed wire 110.

In the glow plug 100, the resistance wire 112 acts as a heating element. The resistance wire 112 is exposed in the combustion chamber or the swirl chamber. The function and operation of these components are the same as those of a common heating coil-type glow plug.

The glow plug 100 furthermore has a microwave transmission channel 114 that passes through the cap 104 and is arranged inside the case 106 from the cap side toward the resistance wire-side; and a rod-shaped antenna 116 which is connected to the microwave transmission channel 114 on the side of the resistance wire 112 and in which the emission end is arranged facing the resistance wire 112.

The glow plug 100 is thus housed in the microwave transmission channel for introducing microwaves into the combustion chamber, and is integrally configured with the antenna 116. Accordingly, ignition and combustion can be enhanced by plasma as described above without making special modifications to the diesel engine by mounting the glow plug 100 in the diesel engine.

(Modification of the Third Embodiment)

Figure 7:
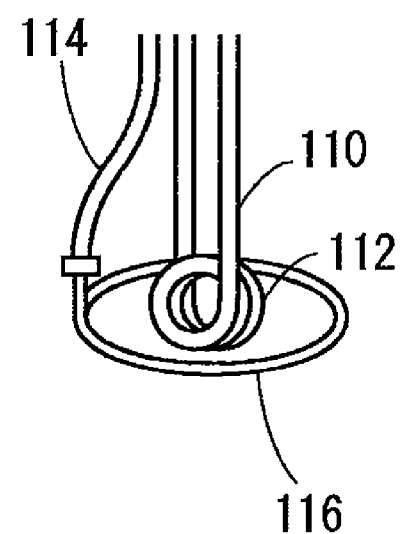
FIG. 7 is a view showing the arrangement of the antenna and the heating coil according to a modified example of the third embodiment.

The antenna 116 is not limited to a rod shape. A ring-shaped antenna disposed so as to surround the resistance wire 112, as shown in FIG. 7, is also possible. A loop antenna having the same shape is also possible. Any shape may be used as long as the shape forms microwaves in the vicinity of the resistance wire. However, the antenna 116 preferably does not make contact with the resistance wire.

(Fourth Embodiment)

Figure 8:
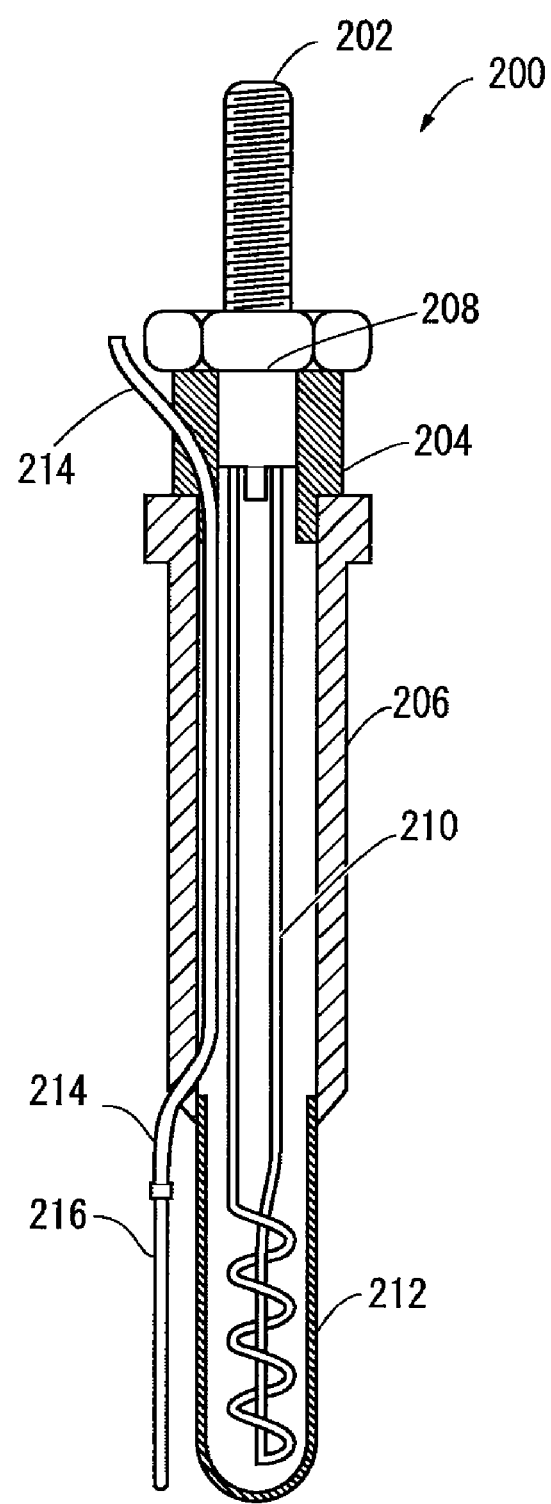
FIG. 8 is a schematic structural view of the glow plug according to the fourth embodiment.

FIG. 8 shows the composition of a glow plug 200 according to the fourth embodiment. The glow plug 200 is a so-called sheathed glow plug, and the resistance wire is covered by an electroconductive sheath 212, as shown in FIG. 8. A microwave transmission channel 214 is exposed to the exterior near the joint portion between a case 206 and the sheath 212. The emission end of an antenna 216 is arranged facing the vicinity of the distal end of the sheath 212.

In the glow plug 200, the sheath 212 makes contact with the mixture; and the sheath 212 is a heating element. This composition makes it possible to also use a sheath-type glow plug to implement the second embodiment and the preferred operation and effects of the second embodiment.

(Modification of the Fourth Embodiment)

Figure 9:
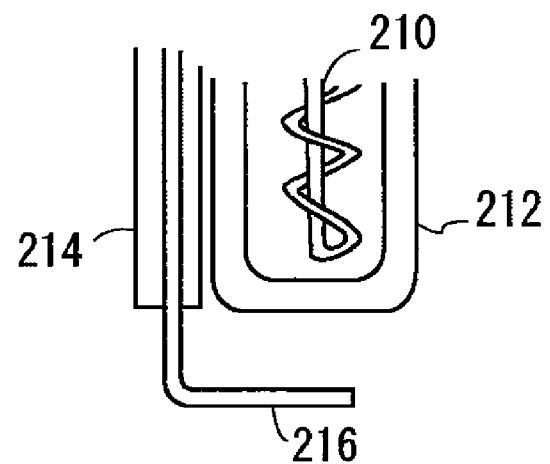
FIG. 9 is a cross-sectional view of the distal end of the glow plug according to the first modified example of the fourth embodiment.
Figure 10:
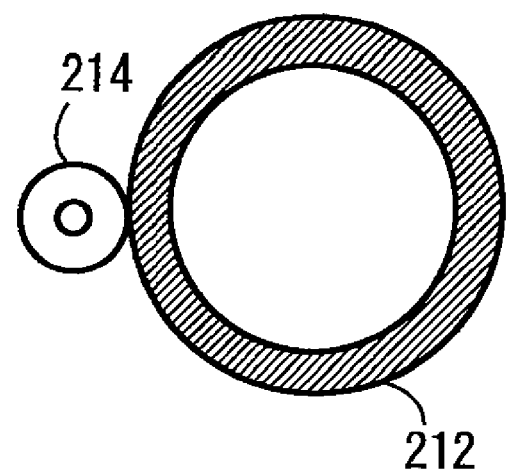
FIG. 10 is a view showing the arrangement of the microwave transmission channel and the sheath of the first modified example of the fourth embodiment.
Figure 11:
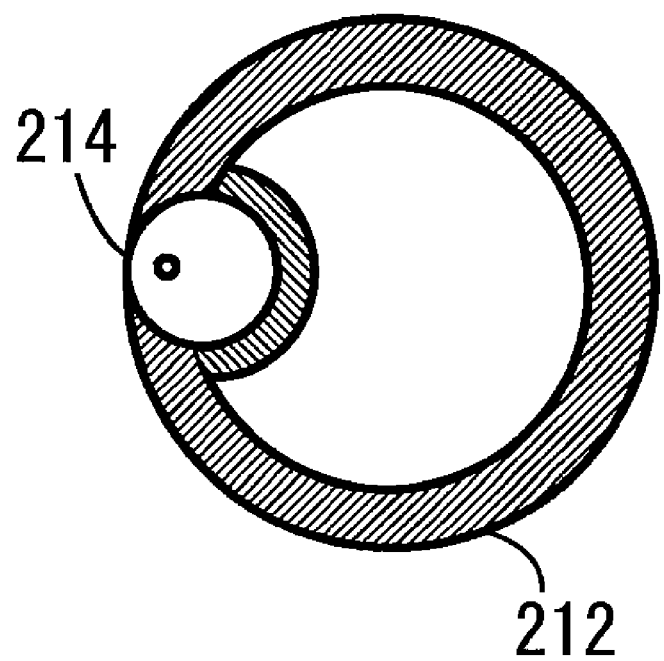
FIG. 11 is a view showing another arrangement of the microwave transmission channel and the sheath of the first modified example of the fourth embodiment.

In the example shown in FIG. 8, the antenna 216 and the microwave transmission channel 214 are connected in the vicinity of the joint portion between the sheath 212 and the case 206, but no limitation is imposed by such a composition. The microwave transmission channel 214 may reach as far as the vicinity of the distal end of the sheath 212, as shown in FIG. 9. In this case, the microwave transmission channel is preferably composed of a material having high heat resistance. The microwave transmission channel 214 may be in contact with the sheath 212, as shown in FIG. 10. The microwave transmission channel 214 may be embedded in the sheath 212, as shown in FIG. 11. Since the microwave transmission channel 214 is supported by the sheath 212, the positional relationship between the antenna 216 and the sheath 212 is readily maintained. However, the microwave transmission channel system must have sufficient heat resistance in the case that a composition is used in which the microwave transmission channel 214 is extended to the distal end of the sheath 212.

Figure 12:
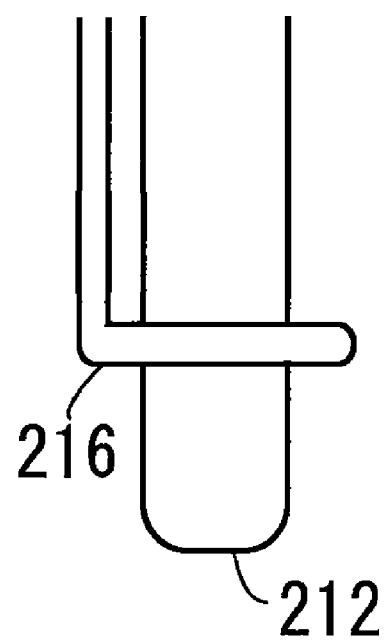
FIG. 12 is a view showing the arrangement of the antenna in the second modified example of the fourth embodiment.
Figure 13:
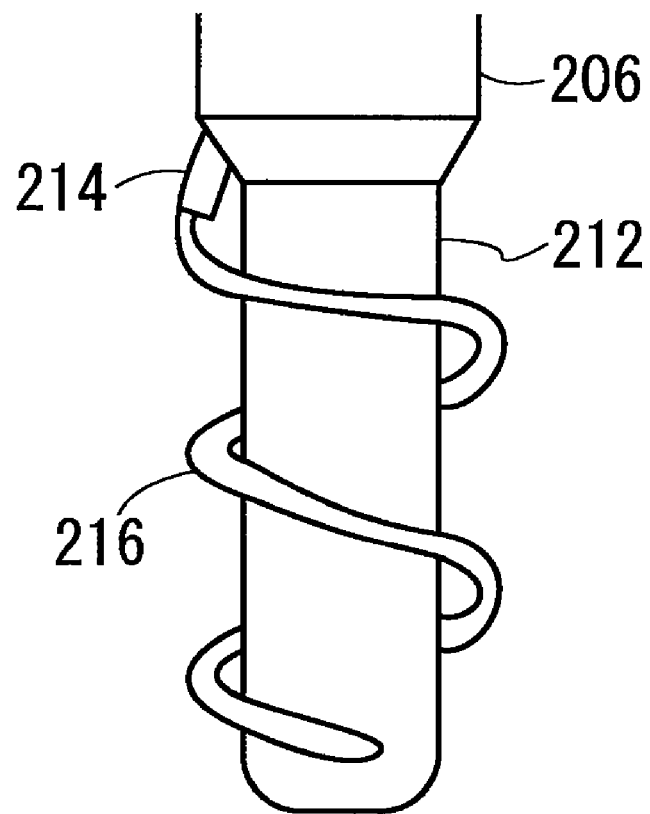
FIG. 13 is a view showing the arrangement of the antenna in the third modified example of the fourth embodiment.
Figure 14:
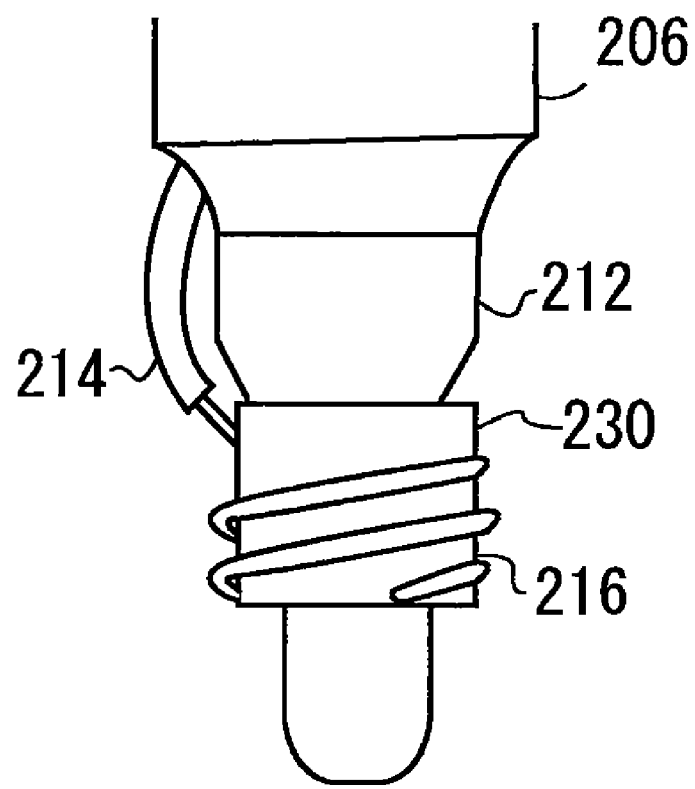
FIG. 14 is a view showing another arrangement of the antenna in the third modified example of the fourth embodiment.
Figure 15:
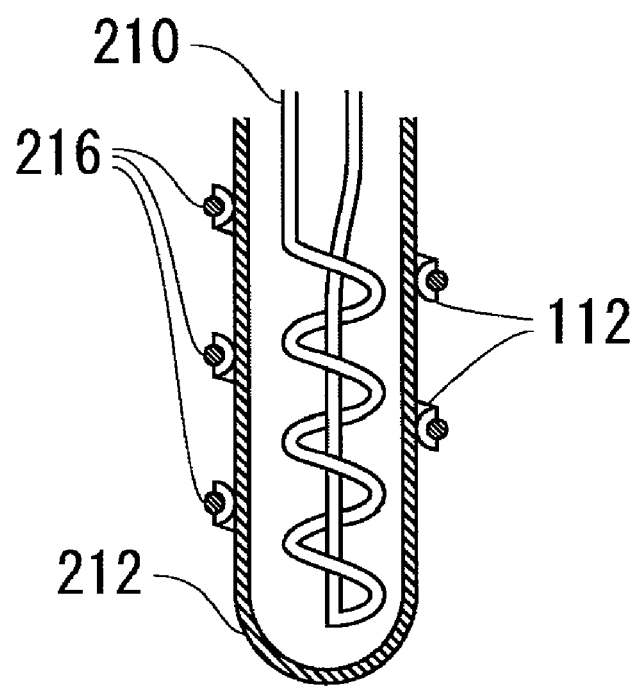
FIG. 15 is a view showing yet another arrangement of the antenna in the third modified example of the fourth embodiment.

The antenna is not limited to a rod antenna such as that shown in FIG. 8. For example, the shape may be a ring shape that surrounds the sheath while retaining a predetermined distance from the sheath 212, as shown in FIG. 12. The antenna may be a coil shape that surrounds the sheath 212 in the form of a spiral while maintaining a predetermined distance from the sheath 212, as shown in FIG. 13. A dielectric ring 230 may be disposed on the surface of the sheath 212, and the antenna 216 may be wound about the surface of the ring 230, as shown in FIG. 14. A coil-shaped dielectric may be disposed between the sheath 212 and the antenna 216 along the spiral-shaped antenna 216 to thereby provide insulation between the sheath 212 and the antenna 216, as shown in FIG. 15. This composition is also implemented by directly winding a coaxial cable as the microwave transmission channel 214 onto the sheath 212, and by exposing only the center wire, which is the portion that corresponds to the antenna 216.

When the sheath 212 and the case 206 are insulated and the microwave transmission channel 214 is connected to the sheath 212, the sheath 212 as such can be used as an antenna. However, in this case, the shape of the sheath is preferably a shape that is suitable for emitting microwaves. Specifically, it is preferred that the shape be one that resonates with the microwaves being fed.

(Fifth Embodiment)

Figure 16:
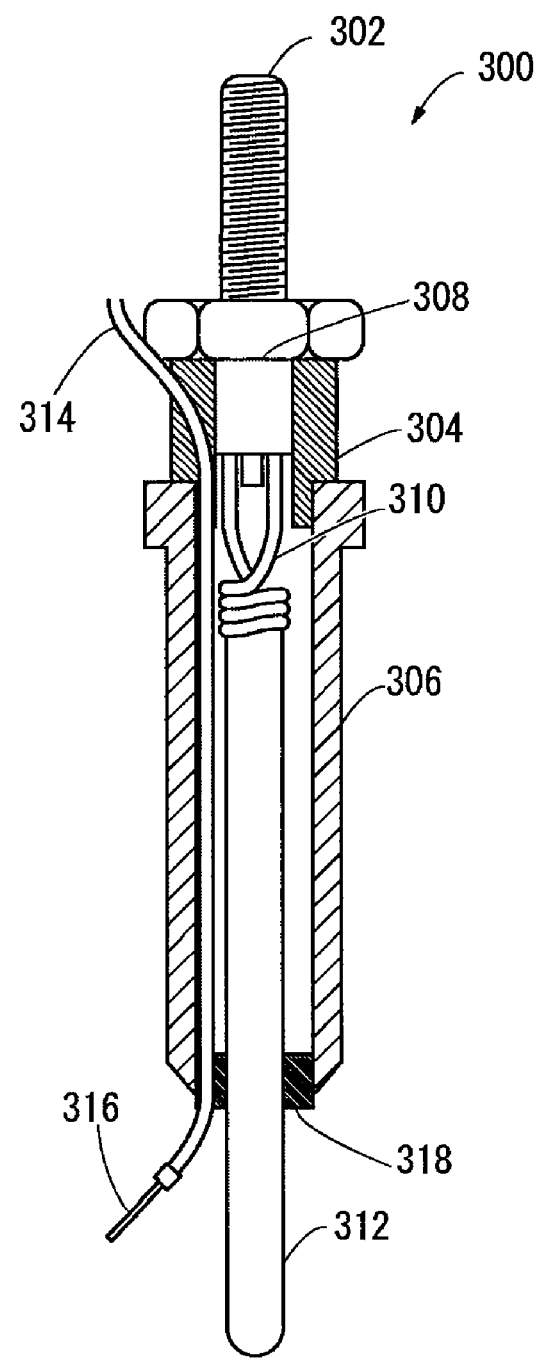
FIG. 16 is a schematic structural view of the glow plug according to the fifth embodiment.

FIG. 16 shows the composition of a glow plug 300 according to the fifth embodiment. The glow plug 300 is a so-called ceramic heater-type glow plug, as shown in FIG. 16, and a ceramic heater 312 connected to a power feed wire 310 is the heating element. A microwave transmission channel 314 is exposed to the exterior in the vicinity of the joint portion between the case 306 and the ceramic heater 312. The emitting end of the antenna 316 is disposed facing the vicinity of the distal end of the ceramic heater 312.

In the glow plug according to the present embodiment, the antenna 316 may be in contact with the ceramic heater 312, as shown in FIG. 16, because the surface of the ceramic heater 312 is a dielectric.

(Other Modified Examples)

In the embodiments described above, microwaves are emitted toward thermions, or plasma is generated in accompaniment with the flame, but the present invention is not limited to such a composition. In other words, plasma may be formed on a small scale in advance in the region in which plasma is to be generated, and microwaves may be emitted toward the charged particles in the plasma. Small-scale plasma can be formed by using a spark plug or another electric discharge electrode, or by emitting laser light or the like. Since microwaves can cause plasma to expand and grow, the small-scale plasma is not required to be large scale and can be of a size sufficient to produce ignition alone.

In the embodiments described above, the spatial distribution of the electric field may be set from moment to moment using microwave emissions in accordance with current conditions, which include the flow rate of the fuel injected by the injector, speed disturbance, diffusion rate of substances, temperature, pressure, amount of locally generated heat, fuel concentration, chemical reaction speed, rate of generation of active chemical species, deactivation rate of the active chemical species, and other fuel conditions, as well as operating conditions during cold start, transient operation, and at other times. Temporal changes in the frequency of the microwave to be emitted, the strength of the microwaves, and the like may also be changed in accordance with the conditions or the like described above. These conditions may be set by, e.g., the ECU. Accordingly, it is possible to control mixture formation, ignition delay timing, spread of the flame, amount of generated exhaust gas, or the uniformity of areas of higher temperatures.

The antenna arrangement position is not limited to that described above, and any number, arrangement, mode, and shape can be used as long as an electric field for achieving the operation and effects described above is formed. For example, the antenna may be disposed in the cylinder, piston head, valve, or gasket.

Plasma initiation is not limited to that described above, and it is possible to use plasma that is generated in accompaniment with laser-induced breakdown, friction, collision, and the like. Plasma initiation may also be carried out by explosions, flame formation, combustion, and other chemical reactions.

(Effect of Plasma on the Pre-injection of Fuel)

The injector may inject fuel over a plurality of cycles as does, for example, a common rail system in which fuel is injected according to a scheme referred to as pilot, pre-, main, post, and after. Plasma may be sustained by emitting electromagnetic waves toward injected material other than the injected material provided for compression combustion (the main injection in the common rail system), from among various types of fuel injections. For example, the injector may inject fuel before injecting fuel for compression combustion (hereinafter referred to as pre-injection), and the chemical activity or chemical reactivity of the gas provided to the reaction with fuel is increased by the plasma when the plasma is sustained in the space near the jet flow of pre-injected fuel. The fuel jet flow and the gas having higher chemical activity or chemical reactivity are mixed together, and a highly ignitable working fluid is formed. Compression ignition readily occurs thereafter due to the effect of the highly ignitable working fluid when the fuel for compression ignition is injected. This contributes to reducing the ignition delay time and facilitating the spread of the flame.

When plasma is generated is correspondence with such fuel pre-injection, it is possible to achieve the same operation and effects as those provided by pilot injection or pre-injection in a common rail system by using a smaller injection amount or a lower valve-opening pressure than with a general common rail.

It is also possible to generate plasma in accordance with pilot injection or pre-injection as a substitute for other types of pre-injection. This contributes to simplification of fuel injection control.

The highly oxidative active chemical species generated in accompaniment with the generation of plasma by microwave emission can be ignited at a lower temperature than the mixture of fuel and air. Accordingly, in a pre-injection scheme in which ignition is not carried out in an ordinary common rail system or the like, an electromagnetic wave may be emitted, and ignition may be directly carried out using the chemical reaction between fuel and the active chemical species having high oxidative power for the plasma. Heat is generated by igniting the pre-injected fuel. This ignition reduces the molecular weight of the fuel and increases the number of molecules in the working fluid in the combustion chamber. The temperature and pressure in the combustion chamber is increased accordingly. In other words, ignition of the pre-injected fuel can be used to supplement a portion of the energy required in adiabatic compression for compressing and igniting the working fluid in the combustion chamber.

In the embodiments described above, examples of fuel injection in the combustion chamber or in an auxiliary chamber were described, but the present invention is not limited to such a composition. For example, fuel may be injected from a space outside the combustion chamber, as is the case with port fuel injection (PFI). Plasma is not necessarily required to be generated in the combustion chamber or in the auxiliary chamber. Fuel and gas provided to the reaction with fuel in which plasma is sustained may be introduced from outside the combustion chamber or outside the auxiliary chamber into these spaces. In order to achieve the above, there may be provided a separate plasma reaction chamber and a working-fluid introduction pathway that is in communication with the plasma reaction chamber. Also, plasma may be generated directly upstream or directly downstream of the combustion chamber.

In the embodiments described above, air was described as an example of the gas provided to the reaction with fuel, but in the present invention, the gas provided to the reaction with fuel is not necessarily limited to air. For example, the gas provided to the reaction with fuel may contain at least an oxidizing gas as long as the fuel generates heat or the number of gas molecules in the combustion chamber is increased as a result of an oxidation-reduction reaction. The oxidizing gas may be oxygen, but no limitation is imposed thereby, and the oxidizing gas may be suitably selected in accordance with the fuel. The gas provided to the reaction with fuel may be suitably selected in accordance with the reaction as long as the fuel produces heat or the number of gas molecules in the combustion chamber is increased as a result of a reaction other than the oxidation-reduction reaction with the gas provided to the reaction.

Naturally, the gas provided to the reaction with fuel in the present invention is not necessarily required to be composed solely of substances that chemically react with fuel in the reaction taking place in the combustion chamber, similar to the case in which a noble gas or another so-called inert gas in air is not involved in the reaction between fuel and air. For example, the gas provided to the reaction with fuel may contain combustion exhaust that is introduced by EGR or the like described above. In another example, moisture may be added to the gas provided to the reaction with fuel, and the amount of moisture exceeds the amount provided to generate the highly chemically active or reactive chemical species in the embodiments described above.

A solid or liquid substance may be added to the gas provided to the reaction with fuel. The substance may be a spray, liquid, droplet, colloidal, or particulate. A mixed laminar flow of air and at least one of the above may be formed. Plasma, electrons, or other charged particles may be added to the fuel. For example, combustion residue and fragments or the like of the substance that forms the combustion chamber may be included.

The microwave emission time may be further extended beyond these emission times when active use is made of the properties of thermal-equilibrium plasma or the heat of the plasma.

In the case that the injector has a plurality of nozzles, the plasma may be generated in a predetermined sequence in the fuel injected by the nozzles. The spatial advance of the combustion reaction can be controlled accordingly. For this reason, a plurality of antennas may be provided, or the position of the electric field in the area may be sequentially modified using a single antenna.

In accordance with the embodiments described above, a desired pressure distribution can be obtained by generating plasma. This can be used to reduce or avoid knocking. For example, when excessive pressure vibrations are generated, plasma may be generated so as to reduce the amplitude by generating combustion vibrations that are in opposite phase to the pressure vibrations. When knocking occurs, the duration of knocking can be reduced by generating plasma and forcibly causing separate knocking to occur. The compression ratio can be increased while reducing the effect of knocking by damping or preventing such knocking. Combustion may be further controlled using plasma having such a high compression ratio.

In the embodiments described above, any fuel type may be used in the compression-ignition internal combustion engine. However, the generation of plasma may be determined in accordance with the fuel type, and the effect of plasma on the working fluid can be adjusted. Various known techniques may be used for determining the fuel type for making the adjustment. The effect of the differences in the fuel type on the operation of the compression-ignition internal combustion engine can be reduced by adjusting the effect of the plasma on the working fluid in accordance with the fuel type. This contributes to more stable operation.

Microwave emissions described above and the generation of plasma in accompaniment therewith may be controlled for each cycle or each cylinder. Cycle fluctuations in combustion and fluctuations between cylinders can be adjusted. Adjustments can be made so as to reduce these fluctuations and to stabilize operation of the entire compression-ignition internal combustion engine. Adjustments can be made so as to increase these fluctuations and to make use of the vibrations generated in the compression-ignition internal combustion engine as a result.

The antenna used for emitting microwaves may be an aperture antenna typified by, e.g., a horn antenna. A composition is also possible in which the gas flow channel as such doubles as a waveguide or an aperture antenna as long as the shape and material of the gas flow channel allows for such a composition. The antenna may have a composition having a radiating element composed of an element connected to an electromagnetic wave generation source, and a reflector for reflecting electromagnetic waves form the radiating element. The antenna may also have a composition having a radiating element and a vane or resonant element that acts as a medium for conducting electromagnetic waves radiated from the radiator.

Various combinations can be envisioned in the relationship between the number of antennas and the number of regions that are the target of electromagnetic wave emissions. Electromagnetic waves may be emitted from a plurality of antennas or a plurality of elements in an antenna toward a single region as the target of electromagnetic wave emissions. A plurality of regions as the target of electromagnetic wave emission may be provided to the antenna in accordance with the number of regions having a strong electric field, as long as a plurality of regions having a strong electric field can be formed in terms of space, an example being an antenna provided with elements having an electrical length of ¾ wavelength or greater. Charged particles that accompany plasma may be prepared in a set plurality of regions to form plasma simultaneously in the plurality of regions.

The embodiments described above are merely examples, and the present invention is not limited to only the embodiments described above. The scope of the present invention is described in each claim of the claims section with consideration given to the detailed description of the present invention, and includes all modifications that are within the scope and meaning equivalent to the description therein.

The invention claimed is:

1. A compression-ignition internal combustion engine in which fuel is injected by an injector into a combustion chamber in which gas provided to a reaction with fuel is present in compressed form, and the fuel is compressed and ignited, the compression-ignition internal combustion engine comprising:

at least one antenna in the combustion chamber, and
wherein when charged particles and moisture or the gas provided to the reaction with fuel in the combustion chamber are present, a microwave electromagnetic wave is emitted by the at least one antenna in a space in which the charged particles and the gas provided to the reaction with the fuel are present, and
wherein plasma is generated in the space by feeding energy to the charged particles, and
wherein the microwave electromagnetic wave is emitted using the antenna when fuel is injected by the injector, a strong electric field is formed in a space near the fuel jet flow, and energy is fed to the charged particles in the space near the fuel jet flow, whereby plasma is generated in the space.

2. The compression-ignition internal combustion engine according to claim 1, wherein the microwave electromagnetic wave is emitted using the antenna when fuel is injected by the injector, a strong electric field is formed in a space near the end point of the fuel jet flow, and energy is fed to charged particles in the space near the end point of the fuel jet flow, whereby plasma is generated in the space.

3. The compression-ignition internal combustion engine according to claim 1,
wherein the injector pre-injects fuel at least one time from the time the intake stroke is ended to the time the fuel subjected to compression ignition is injected; and
wherein the microwave electromagnetic wave is emitted using the antenna when fuel is pre-injected by the injector, a strong electric field is formed in a space near the fuel jet flow, and energy is fed to the charged particles in the space near the fuel jet flow, whereby plasma is generated in the space.

4. The compression-ignition internal combustion engine according to claim 3, wherein the pre-injected fuel is ignited by generation of the plasma.

5. The compression-ignition internal combustion engine according to claim 1,
wherein the injector has a plurality of nozzles; and
wherein the microwave electromagnetic wave is emitted toward spaces between the plurality of jet flows from the plurality of nozzles.

6. The compression-ignition internal combustion engine according to claim 1, wherein a strong electric field is formed near the boundary between the fuel jet flow and gas provided to the reaction with the fuel after the fuel has been ignited, and energy is fed to the charged particles generated by a charged-particle flame inside a flame produced near the boundary.

7. The compression-ignition internal combustion engine according to claim 1,
wherein the microwave electromagnetic waves are emitted intermittently; and
wherein the plasma generated in the space by the emission of the microwave electromagnetic wave is non-equilibrium plasma.

8. The compression-ignition internal combustion engine according to claim 1, wherein the microwave electromagnetic wave is emitted during cold start or during transient operation.

9. An injector used in the compression-ignition internal combustion engine according to claim 1, comprising:
at least one nozzle provided to an injector main unit; and
an antenna arranged on the outer surface of the injector main unit,
wherein the antenna emits the microwave electromagnetic wave toward the vicinity of a jet flow from the nozzles.

* * * * *